(12) United States Patent
Aoki et al.

(10) Patent No.: US 7,986,594 B2
(45) Date of Patent: Jul. 26, 2011

(54) OPTICAL PICKUP

(75) Inventors: Takao Aoki, Yokohama (JP); Masaki Murayama, Yokohama (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 116 days.

(21) Appl. No.: 12/456,580

(22) Filed: Jun. 18, 2009

(65) Prior Publication Data

US 2009/0323479 A1    Dec. 31, 2009

(30) Foreign Application Priority Data

Jun. 27, 2008  (JP) .................................. 2008-168513

(51) Int. Cl.
*G11B 7/00*    (2006.01)
(52) U.S. Cl. .................................................. 369/44.15
(58) Field of Classification Search ............... 369/44.14, 369/44.15, 44.12, 44.19, 44.22, 44.16
See application file for complete search history.

(56) References Cited

U.S. PATENT DOCUMENTS 6,160,771 A * 12/2000 Kawano et al. ............ 369/44.15

FOREIGN PATENT DOCUMENTS

| JP | 2002-510834 | 9/2002 |
| JP | 2002-367204 | 12/2002 |
| JP | 2004-152421 | 5/2004 |
| WO | WO 99/52102 | 10/1999 |

* cited by examiner

*Primary Examiner* — Nabil Z Hindi
(74) *Attorney, Agent, or Firm* — Renner, Kenner, Greive, Bobak, Taylor & Weber (57) ABSTRACT

An optical pickup has a lens actuator, at least one suspension wire having a first end and an opposite second end, the lens actuator being held by the wire at the first end, and a support base to which the wire is fixed at the second end. The support base has at least one cutaway section provided as corresponding to the wire, having a concavity to receive at least partially the wire in cross section orthogonal to a longitudinal direction of the wire, the concavity curving in a direction parallel to the cross section of the wire, and a land formed around the cutaway section, the wire being soldered to the land at the second end while the wire is being received at least partially by the concavity.

6 Claims, 6 Drawing Sheets

OPTICAL PICKUP

CROSS-REFERENCE TO RELATED APPLICATIONS

This application is based on and claims the benefit of priority from the prior Japanese Patent Application No. 2008-168513 filed on Jun. 27, 2008, the entire contents of which is incorporated herein by reference.

BACKGROUND OF THE INVENTION

The present invention relates to an optical pickup with a lens actuator held by suspension wires fixed to a suspension-wire support base.

An optical pickup has been widely used in optical-disc recording and/or reproducing apparatuses, as a main component for recording information on or reproducing it from optical-information storage media, such as, optical discs.

An optical pickup is mainly constituted by: a lens actuator for tracking and focusing to an optical disc; suspension wires for holding and moving the actuator; and a suspension-wire support base to which the wires are fixed in order to hold the actuator.

Figure 1:
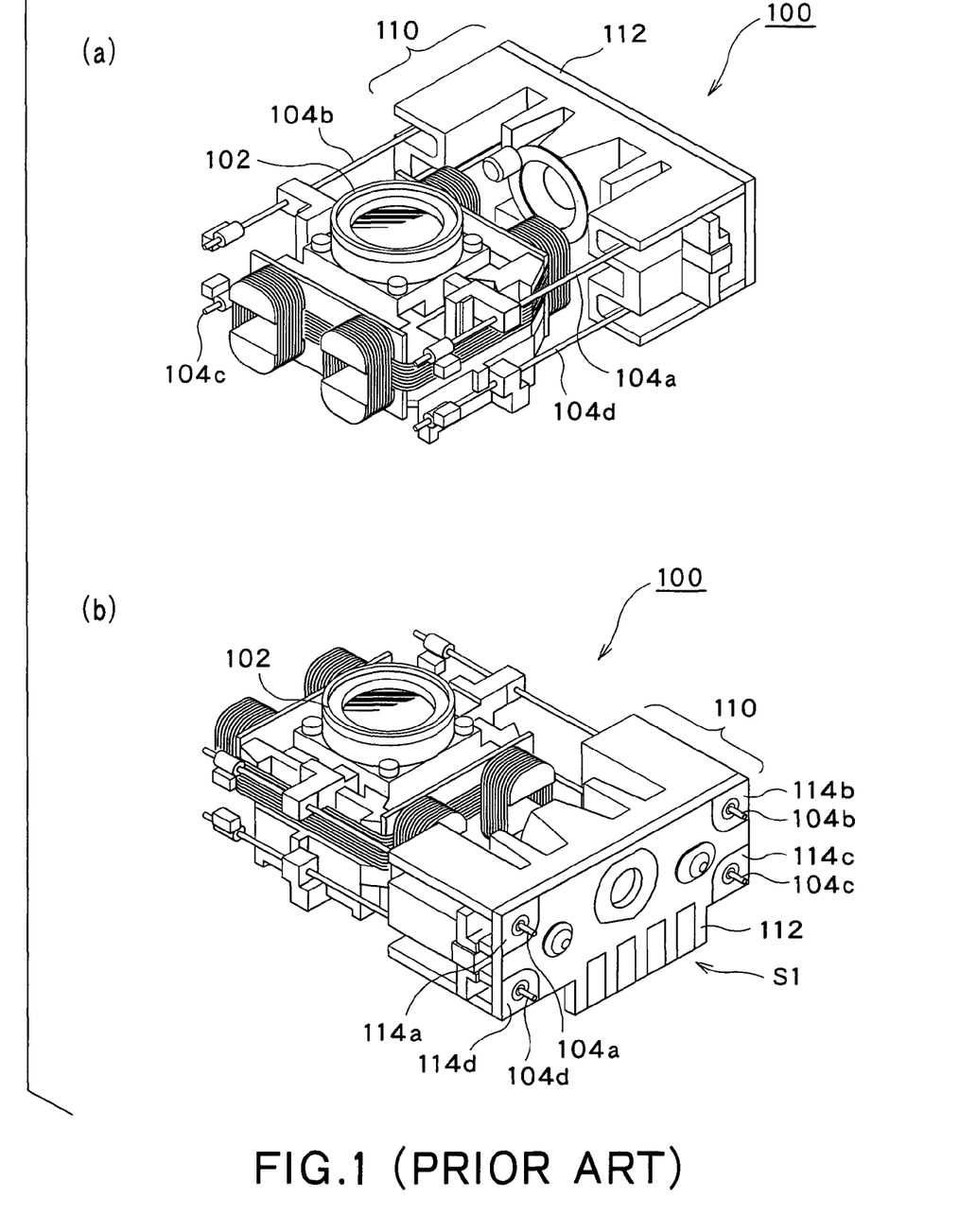
FIG. 1 shows perspective views of a known optical pickup in (a) and (b) viewed from a lens actuator side and a suspension-wire support base side, respectively.
Figure 2:
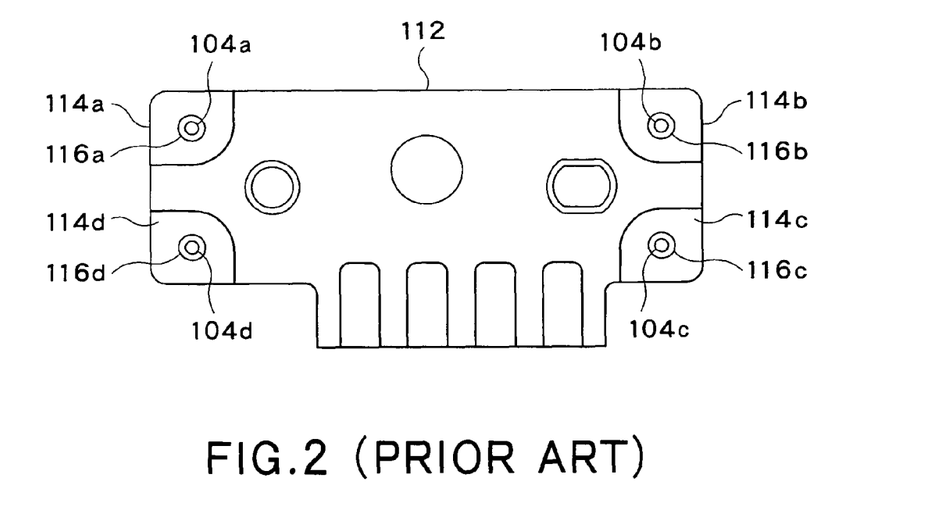
FIG. 2 shows a plan view of a printed circuit board installed in the known optical pickup.
Figure 3:
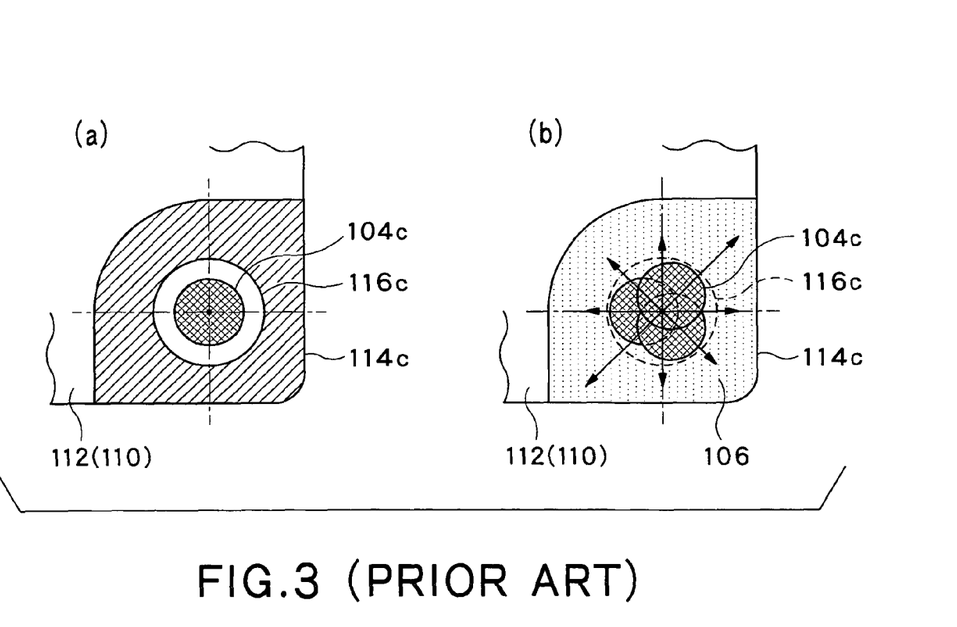
FIG. 3 shows enlarged views of each of four corners of the printed circuit board of the known optical pickup in (a) and (b) which illustrates dynamic moments caused by soldering.

Shown in FIGS. 1 to 3 is an example of an optical pickup disclosed in Japanese Un-examined Patent Publication No. 2004-152421.

As shown in (a) and (b) of FIG. 1, a known optical pickup 100 is mainly constituted by: a lens actuator 102; four suspension wires 104a, 104b, 104c and 104d for holding and moving the actuator 102; and a suspension-wire support base 110 to which the wires 104a, 104b, 104c and 104d are fixed in order to hold the actuator 102.

Shown in (a) and (b) of FIG. 1 are perspective views of the optical pickup 100 when viewed from the lens actuator 102 side and the suspension-wire support base 110 side, respectively.

Mounted on the suspension-wire support base 110 is a printed circuit board 112, as shown in FIG. 2, that is a plan view when viewed in a direction indicated by an arrow S1 in (b) of FIG. 1.

Provided on the printed circuit board 112 are: holes 116a, 116b, 116c and 116d into which the suspension wires 104a, 104b, 104c and 104d are inserted, respectively; and lands 114a, 114b, 114c and 114d formed on one side of the board 112 and formed as surrounding the holes 116a, 116b, 116c and 116d, respectively.

The holes 116a, 116b, 116c and 116d have a larger diameter than the suspension wires 104a, 104b, 104c and 104d so that the wires can easily be inserted into the holes.

Discussed with reference to (a) and (b) of FIG. 3 is how the suspension wire 104c is inserted into the hole 116c and fixed to the land 114c. The same is true for the suspension wires 104a, 104b and 104d to the holes 116a, 116b and 116d, and the lands 114a, 114b and 114d, respectively.

As illustrated in (a) of FIG. 3, that is an enlarged view of the corner of the printed circuit board 112 on which the land 114c is formed, the suspension wire 104c is inserted into the hole 116c.

The suspension wire 104c is then fixed to the land 114c with a solder 106, as shown in (b) of FIG. 3. While the solder 106 is being applied, it creates tension to the suspension wire 104c with dynamic moments in all directions (360°) as indicated by allows in (b) of FIG. 3 that is also an enlarged view of the corner of the printed circuit board 112 on which the land 114c is formed.

Such dynamic moments are also created for the suspension wires 104a, 104b and 104d.

The dynamic moments cause that the suspension wires 104a, 104b, 104c and 104d are fixed to the lands 114a, 114b, 114c and 114d, respectively, in random positions which may vary per suspension wire or per optical pickup.

Such random positions of the suspension wires 104a, 104b, 104c and 104d on the printed circuit board 112 lead to deviation of the lens actuator 102 with respect to the optical disc, which lowers the accuracy of tracking and focusing, thus causing tracking and/or focusing errors. Therefore, such deviation requires to be minimized as much as possible.

SUMMARY OF THE INVENTION

A purpose of the present invention is to provide an optical pickup with higher positional accuracy for suspension wires fixed to suspension-wire support base.

The present invention provides an optical pickup comprising: a lens actuator; at least one suspension wire having a first end and an opposite second end, the lens actuator being held by the suspension wire at the first end; and a suspension-wire support base to which the suspension wire is fixed at the second end, wherein the suspension-wire support base includes: at least one cutaway section provided as corresponding to the suspension wire, having a concavity to receive at least partially the suspension wire in cross section orthogonal to a longitudinal direction of the suspension wire, the concavity curving in a direction parallel to the cross section of the suspension wire; and a land formed around the cutaway section, the suspension wire being soldered to the land at the second end while the suspension wire is being received at least partially by the concavity.

DETAILED DESCRIPTION OF PREFERRED EMBODIMENTS

Preferred embodiments and modifications of an optical pickup according to the present invention will be described with reference to FIGS. 4 to 9.

First Embodiment

A first embodiment of an optical pickup according to the present invention will be described with reference to FIGS. 4 to 6.

Figure 4:
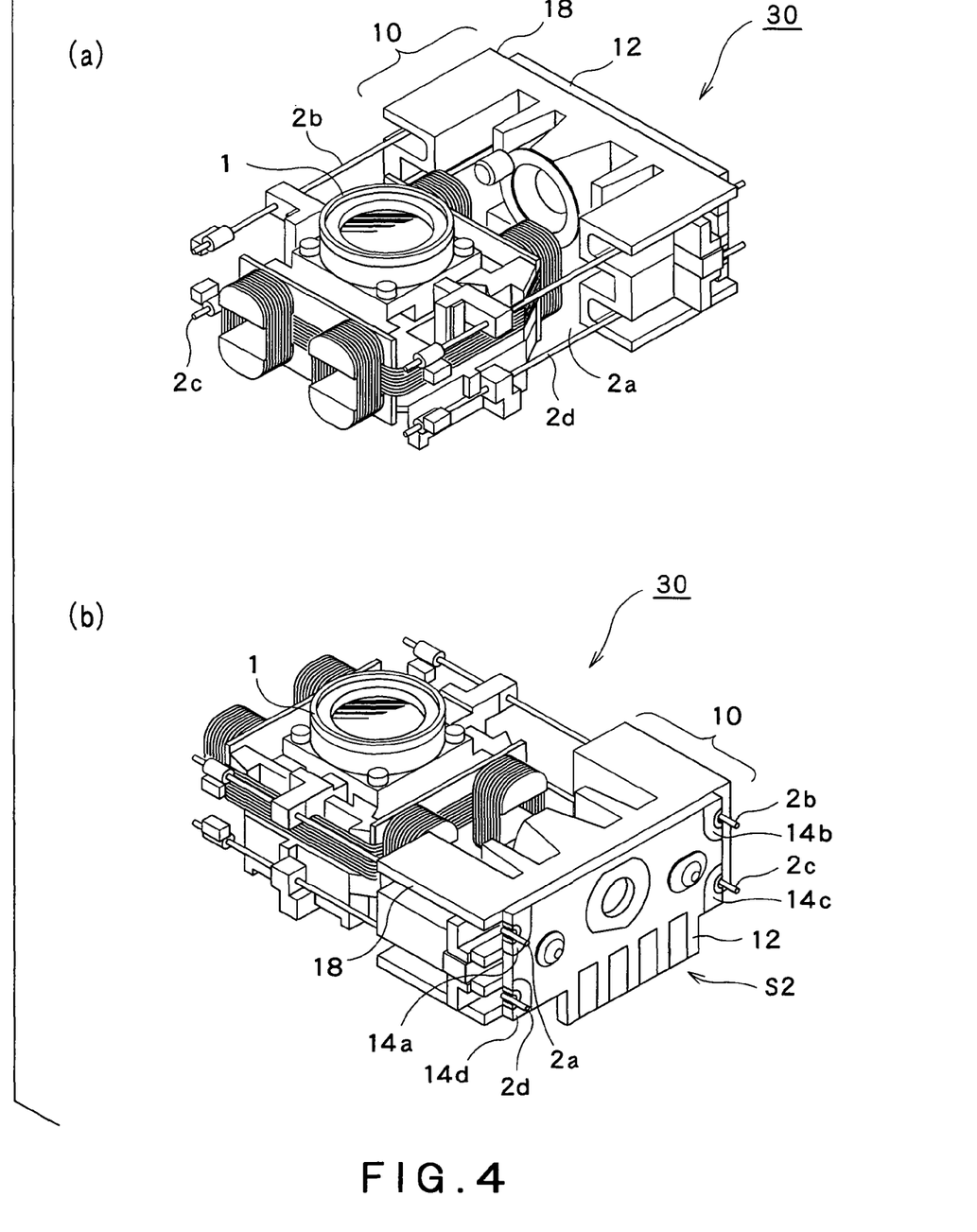
FIG. 4 shows perspective views of a first preferred embodiment of an optical pickup in (a) and (b) viewed from a lens actuator side and a suspension-wire support base side, respectively.

As shown in (a) and (b) of FIG. 4, an optical pickup 30 is mainly constituted by: a lens actuator 1 for tracking and focusing to an optical disc (not shown); four suspension wires 2a, 2b, 2c and 2d for holding and moving the actuator 1; and a suspension-wire support base 10 to which the wires 2a, 2b, 2c and 2d are fixed in order to hold the actuator 1.

Shown in (a) and (b) of FIG. 4 are perspective views of the optical pickup 30 when viewed from the lens actuator 1 side and the suspension-wire support base 10 side, respectively.

Figure 5:
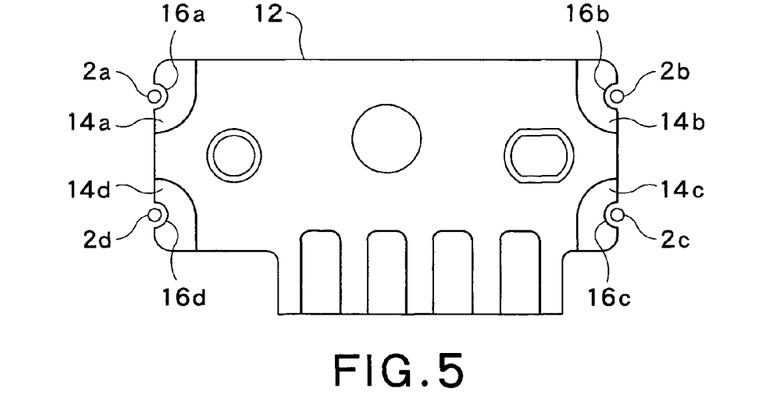
FIG. 5 shows a plan view of a printed circuit board installed in the first embodiment of the optical pickup.

Mounted on the suspension-wire support base 10 is a printed circuit board 12, as shown in FIG. 5 that is a plan view when viewed in a direction indicated by an arrow S2 in (b) of FIG. 4. In detail, the circuit board 12 is supported by a base section 18 of the support base 10. The printed circuit board 12 may be a flexible printed circuit board.

Provided on the printed circuit board 12 are: cutaway sections 16a, 16b, 16c and 16d in the vicinity of the four corners of the circuit board 12, having concavities in which the suspension wires 2a, 2b, 2c and 2d, respectively, can be installed, at least part of each wire in cross section orthogonal to the longitudinal direction of each wire; and lands 14a, 14b, 14c and 14d formed on one side of the circuit board 12 and around the cutaway sections 16a, 16b, 16c and 16d, respectively, to which at least part of the wires 2a, 2b, 2c and 2d are fixed, respectively.

Figure 6:
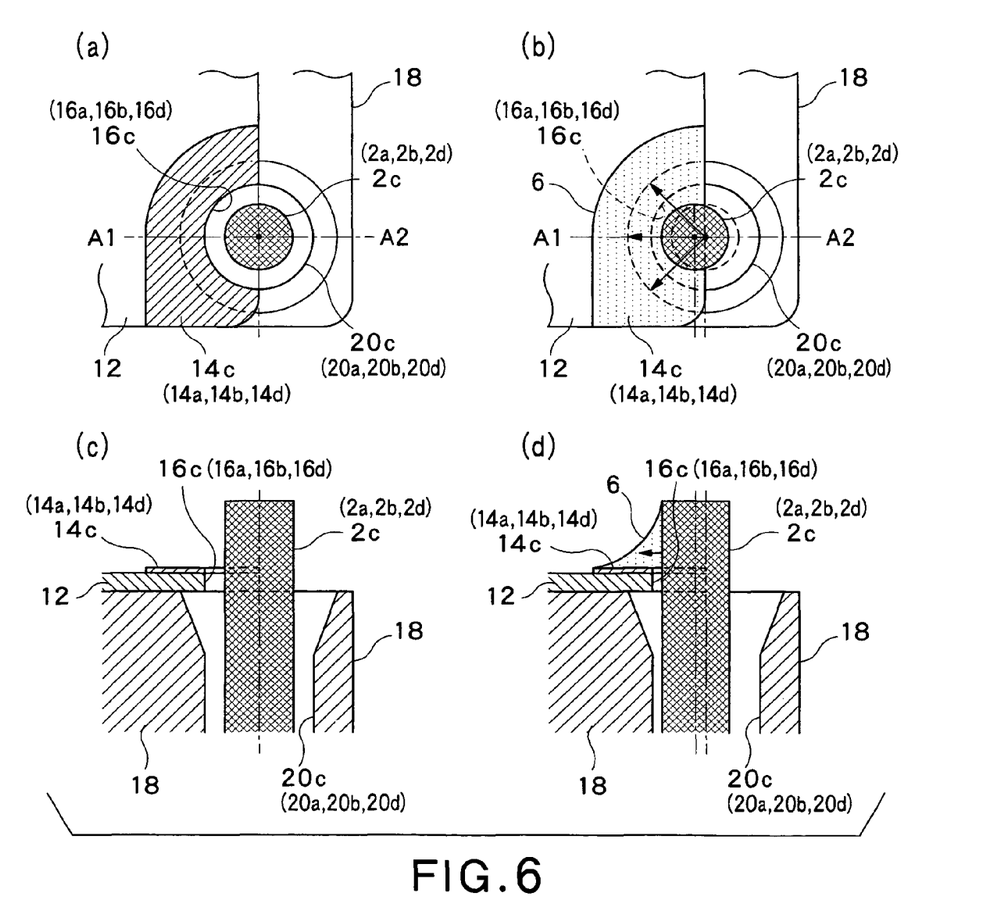
FIG. 6 shows enlarged views of each of four corners of the printed circuit board of the first embodiment, illustrating a feature of the present invention, in which (a) shows an enlarged plan view of a land formed on the corner, (b) an enlarged plan view of the land after soldering, (c) a schematic sectional view taken on line A1-A2 of (a), and (d) a schematic sectional view taken on line A1-A2 of (b)

Provided on the base section 18 are holes 20a, 20b, 20c and 20d, as shown in FIG. 6, having a larger diameter than the suspension wires 2a, 2b, 2c and 2d so that the wires can easily be inserted into the holes.

The printed circuit board 12 is attached to the base section 18 with an adhesive or screws in such a manner that the cutaway sections 16a, 16b, 16c and 16d match the holes 20a, 20b, 20c and 20d, respectively, as shown in FIG. 6.

Shown in (a) of FIG. 6 is an enlarged plan view of the corner of the printed circuit board 12 on which the land 14c is formed. Shown in (b) of FIG. 6 is an enlarged plan view of the land 14c after soldering. Shown in (c) of FIG. 6 is a schematic sectional view taken on line A1-A2 (that passes through the center of the hole 20c) of (a) of FIG. 6. Shown in (d) of FIG. 6 is a schematic sectional view taken on line A1-A2 of (b) of FIG. 6. The illustrated configurations for the land 14c in (a) to (d) of FIG. 6 are also applied to the lands 14a, 14b and 14d.

As shown in (c) and (d) of FIG. 6, in the first embodiment, the holes 20a, 20b, 20c and 20d have a tapered opening so that the suspension wires 2a, 2b, 2c and 2d can easily be inserted thereto, respectively.

Described next with reference to FIG. 6 is how the suspension wire 2c is fixed to the land 14c with a solder 6. The same is true for the suspension wires 2a, 2b and 2d to the lands 14a, 14b and 14d, respectively.

As shown in (a) and (c) of FIG. 6, the suspension wire 2c is inserted into the hole 20c of the base section 18 along the cutaway section 16c from the land 14c side on the printed circuit board 12.

Next, as shown in (b) and (d) of FIG. 6, the suspension wire 2c is fixed to the land 14c with the solder 6.

While the solder 6 is being applied, it creates tension to the suspension wire 2c. However, the land 14c is formed as surrounding the cutaway section 16c, or on one side, the left side in (b) of FIG. 6, with respect to the center axis of the wire 2c. The configuration of the land 14c forces the tension to create dynamic moments only one side in the directions as indicated by allows in (b) of FIG. 6. Such one-side dynamic moments force the wire 2c to move to the one side, or the land 14c side, and fixed there.

Therefore, compared with the known optical pickup 100, as discussed with respect to (b) of FIG. 3, the suspension wires 2a, 2b, 2c and 2d can be fixed to the suspension-wire support base 10 at higher positional accuracy, in the first embodiment.

Second Embodiment

A second embodiment of an optical pickup according to the present invention will be described with reference to FIG. 7.

Figure 7:
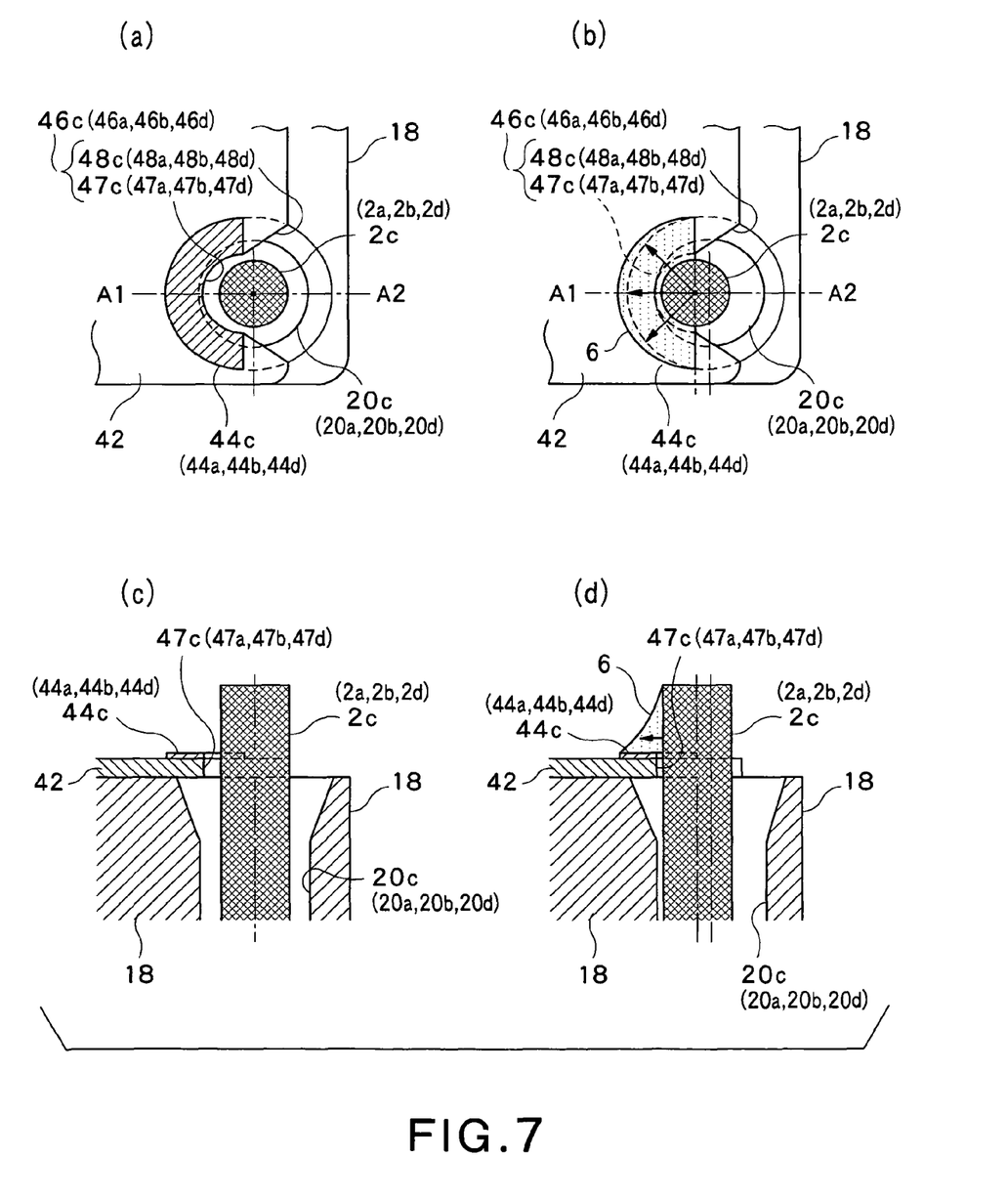
FIG. 7 shows enlarged views of each of four corners of a printed circuit board of a second preferred embodiment of an optical pickup, illustrating a feature of the present invention, in which (a) shows an enlarged plan view of a land formed on the corner, (b) an enlarged plan view of the land after soldering, (c) a schematic sectional view taken on line A1-A2 of (a), and (d) a schematic sectional view taken on line A1-A2 of (b)

The illustrated configurations shown in (a) to (d) of FIG. 7 in the second embodiment correspond to those in (a) to (d) of FIG. 6, respectively, in the first embodiment.

The differences between the first and second embodiments lie in the shape of cutaway sections and lands.

Therefore, the second embodiment will be described mainly with respect the relationship between the suspension wires and the cutaway sections and lands formed on the printed circuit board.

In the following description of the second embodiment, the same or analogous elements are given the same signs or numerals as the first embodiment.

As shown in FIG. 7, a printed circuit board 42 is provided with cutaway sections 46a, 46b, 46c and 46d in the vicinity of the four corners of the circuit board 42, having concavities in which the suspension wires 2a, 2b, 2c and 2d, respectively, can be installed, at least part of each wire in cross section orthogonal to the longitudinal direction of each wire. The printed circuit board 42 may be a flexible circuit board.

The cutaway sections 46a, 46b, 46c and 46d are constituted by: arc-like sections 47a, 47b, 47c and 47d, respectively, having an internal diameter the same as or a little bit larger than the external diameter of the suspension wires 2a, 2b, 2c and 2d, respectively; and opening sections 48a, 48b, 48c and 48d, respectively, having a width the same as or a little bit larger than the internal diameter of the arc-like sections 47a, 47b, 47c and 47d, respectively. Each of the opening sections 48a, 48b, 48c and 48d opens widely towards the outside of the printed circuit board 42.

Moreover, the printed circuit board 42 is provided with arc-like lands 44a, 44b, 44c and 44d formed on one side of the circuit board 42 and around the cutaway sections 46a, 46b, 46c, and 46d, respectively, particularly, around the arc-like sections 47a, 47b, 47c and 47d, respectively.

The printed circuit board 42 is attached to the base section 18 with an adhesive or screws in such a manner that the cutaway sections 46a, 46b, 46c and 46d match the holes 20a, 20b, 20c and 20d, respectively.

Described next with reference to FIG. 7 is how the suspension wire 2c is fixed to the land 44c with the solder 6. The same is true for the suspension wires 2a, 2b and 2d to the lands 44a, 44b and 44d, respectively.

As shown in (a) and (c) of FIG. 7, the suspension wire 2c is inserted into the hole 20c of the base section 18 along the cutaway section 46c from the land 44c side on the printed circuit board 42.

Next, as shown in (b) and (d) of FIG. 7, the suspension wire 2c is fixed to the land 44c with the solder 6.

While the solder 6 is being applied, it creates tension to the suspension wire 2c. However, the land 44c is formed as surrounding the cutaway section 46c, or on one side, the left side in (b) of FIG. 7, with respect to the center axis of the wire 2c. The configuration of the land 44c forces the tension to create dynamic moments only one side in the directions as indicated by allows in (b) of FIG. 7. Such one-side dynamic moments force the wire 2c to move to the one side, or the land 44c side and fixed there.

Therefore, compared with the known optical pickup 100, as discussed with respect to (c) of FIG. 3, the suspension wires 2a, 2b, 2c and 2d are fixed to the suspension-wire support base 10 at higher positional accuracy, in the second embodiment.

As described above, the cutaway sections 46a, 46b, 46c and 46d are constituted by: the arc-like sections 47a, 47b, 47c and 47d, respectively, having an internal diameter the same as or a little bit larger than the external diameter of the suspension wires 2a, 2b, 2c and 2d, respectively; and the opening sections 48a, 48b, 48c and 48d, respectively, having a width the same as or a little bit larger than the internal diameter of the arc-like sections 47a, 47b, 47c and 47d, respectively. Each of the opening sections 48a, 48b, 48c and 48d opens widely towards the outside of the printed circuit board 42.

Such configurations of the cutaway sections 46a, 46b, 46c and 46d provide the following advantages.

The suspension wires 2a, 2b, 2c and 2d can easily be inserted into the holes 20a, 20b, 20c and 20d, respectively, along the opening sections 48a, 48b, 48c and 48d, respectively, each opening widely towards the outside of the printed circuit board 42.

The suspension wires 2a, 2b, 2c and 2d can be installed in the arc-like sections 47a, 47b, 47c and 47d, respectively, at least part of each wire in cross section orthogonal to the longitudinal direction of each wire, while each wire is pushed to the land side due the tension created by the solder 6.

Therefore, compared with the first embodiment, the suspension wires 2a, 2b, 2c and 2d can be fixed to the suspension-wire support base 10 at higher positional accuracy, in the second embodiment.

MODIFICATION

Figure 8:
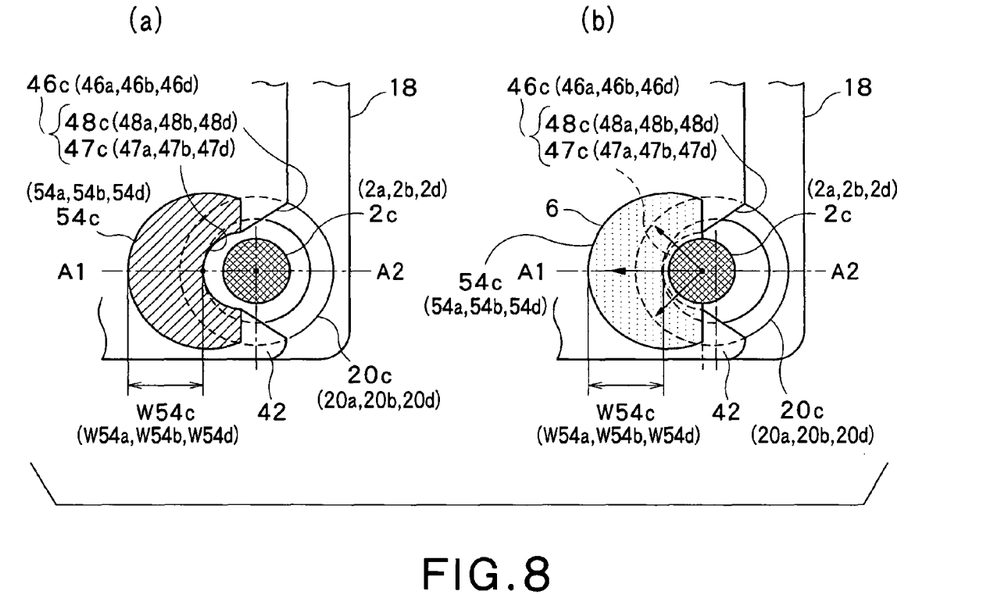
FIG. 8 shows enlarged views of each of four corners of a printed circuit board of a first modification to the second embodiment, illustrating a feature of the present invention, in which (a) shows an enlarged plan view of a land formed on the corner and (b) an enlarged plan view of the land after soldering.
Figure 9:
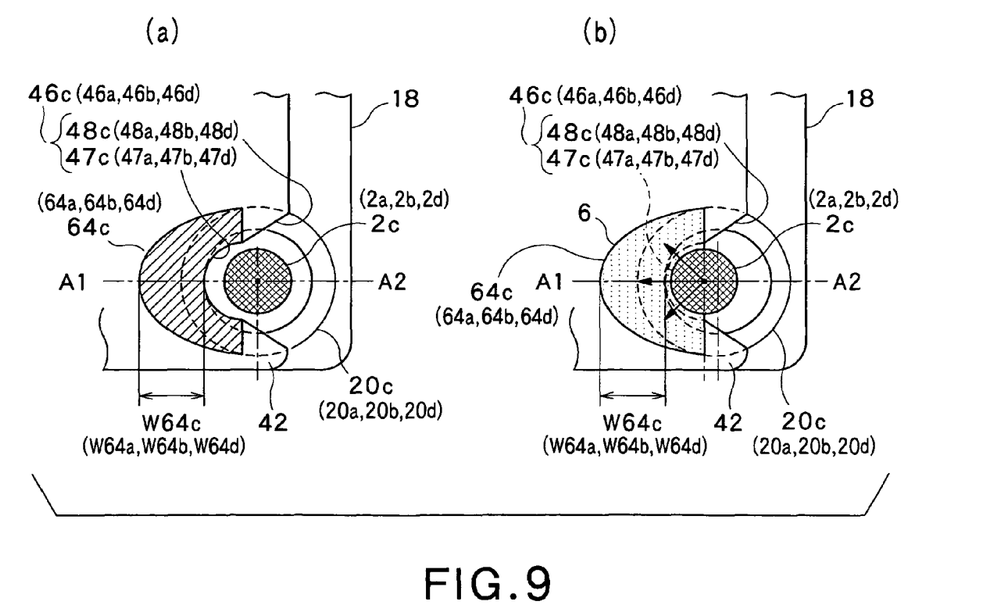
FIG. 9 shows enlarged views of each of four corners of a printed circuit board of a second modification to the second embodiment, illustrating a feature of the present invention, in which (a) shows an enlarged plan view of a land formed on the corner and (b) an enlarged plan view of the land after soldering.

Described next with respect to FIGS. 8 and 9 are a first and a second modification, respectively, to the second embodiment.

Shown in (a) and (b) of FIGS. 8 and 9 are enlarged plan views of the modifications to the second embodiment, which correspond to (a) and (b) of FIG. 7, respectively.

The difference between the first modification shown in FIG. 8 and the second embodiment lies in the shape of lands.

Therefore, the first modification will be described mainly with respect a method to solder the suspension wires to the lands on the printed circuit board.

In the following description of the first modification, the same or analogous elements are given the same signs or numerals as the second embodiment.

Compared with the arc-like lands 44a, 44b, 44c and 44d of the second embodiment shown in (a) of FIG. 7, arc-like lands 54a, 54b, 54c and 54d of the first modification are formed wider as shown in (a) of FIG. 8.

In detail, the lands 54a, 54b, 54c and 54d are formed as having the maximum widths W54a, W54b, W54c and W54d, respectively, each on a straight line that is orthogonal to a peripheral edge of the circuit board 42 and that passes a point on an arc of each of the arc-like sections 47a, 47b, 47c and 47d. The point on the arc is the farthest from the peripheral edge among points on the arc, or it is the deepest point of a concavity created by each arc-like section in parallel to the cross section of each suspension wire.

Such land configuration offers higher tension controllability than that in the second embodiment, forcing the tension of the solder 6 to create the maximum dynamic moment in the direction in which the lands 54a, 54b, 54c and 54d have the maximum widths W54a, W54b, W54c and W54d, respectively.

Therefore, compared with the second embodiment, the suspension wires 2a, 2b, 2c and 2d are fixed to the suspension-wire support base 10 at higher positional accuracy, in the first modification.

The difference between the second modification shown in FIG. 9 and the second embodiment also lies in the shape of lands.

Therefore, the second modification will be described mainly with respect a method to solder the suspension wires to the lands on the printed circuit board.

In the following description of the second modification, the same or analogous elements are given the same signs or numerals as the second embodiment.

Compared with the arc-like lands 44a, 44b, 44c and 44d of the second embodiment shown in (a) of FIG. 7, lands 64a, 64b, 64c and 64d of the second modification are formed into a semi-elliptical shape.

In detail, the lands 64a, 64b, 64c and 64d are formed as having the maximum widths W64a, W64b, W64c and W64d, respectively, each on a straight line that is orthogonal to a peripheral edge of the circuit board 42 and that passes a point on an arc of each of the arc-like sections 47a, 47b, 47c and 47d. The point on the arc is the farthest from the peripheral edge among points on the arc, or it is the deepest point of a concavity created by each arc-like section in parallel to the cross section of each suspension wire.

Such land configuration also offers higher tension controllability than that in the second embodiment, forcing the tension of the solder 6 to create the maximum dynamic moment in the direction in which the lands 64a, 64b, 64c and 64d have the maximum widths W64a, W64b, W64c and W64d, respectively.

Therefore, compared with the second embodiment, the suspension wires 2a, 2b, 2c and 2d are fixed to the suspension-wire support base 10 at higher positional accuracy, in the second modification.

The first and second modifications can also be applied to the first embodiment.

It is further understood by those skilled in the art that the foregoing descriptions are preferred embodiments and their modifications of the disclosed device and that various changes and further modifications may be made in the invention without departing from the sprit and scope thereof.

As disclosed above in detail, the present invention provides an optical pickup with higher positional accuracy for suspension wires fixed to a suspension-wire support base.

What is claimed is:

1. An optical pickup comprising:
   a lens actuator;
   at least one suspension wire having a first end and an opposite second end, the lens actuator being held by the suspension wire at the first end; and
   a suspension-wire support base to which the suspension wire is fixed at the second end, wherein
   the suspension-wire support base includes:
      at least one cutaway section provided as corresponding to the suspension wire, having a concavity to receive at least partially the suspension wire in cross section orthogonal to a longitudinal direction of the suspension wire, the concavity curving in a direction parallel to the cross section of the suspension wire; and
      a land formed around the cutaway section, the suspension wire being soldered to the land at the second end while the suspension wire is being received at least partially by the concavity.

2. The optical pickup according to claim 1, wherein the cutaway section includes an arc-like section having an internal diameter equal to or larger than an external diameter of the suspension wire and an opening section provided as an extension of the arc-like section, the opening section having an opening width equal to or larger than the internal diameter of the arc-like section.

3. The optical pickup according to claim 1, wherein the suspension-wire support base has a printed circuit board, the cutaway section being provided at a peripheral edge of the circuit board, the land being formed on the circuit board in such a way to partially surround the cutaway section, the land being formed as having a maximum width on a straight line that is orthogonal to the peripheral edge of the circuit board in a lateral direction of the circuit board and that passes a deepest point of the concavity in the direction parallel to the cross section of the suspension wire.

4. An optical pickup comprising:
   a lens actuator;
   at least one suspension wire having a first end and an opposite second end, the lens actuator being held by the suspension wire at the first end; and
   a suspension-wire support base to which the suspension wire is fixed at the second end, wherein
   the suspension-wire support base includes:
      at least one cutaway section provided at an edge section of the suspension-wire support base, having a concavity for receiving at least a partial area of the suspension wire in cross section orthogonal to a longitudinal direction of the suspension wire, the concavity curving in a direction parallel to the cross section of the suspension wire; and
      a land provided corresponding to the cutaway section, the suspension wire being soldered to the land at the second end;
      wherein the cutaway section includes an arc-like section having an internal diameter the same as or larger than an external diameter of the suspension wire for receiving only the partial area of the suspension wire, the land being formed only around the arc-like section.

5. The optical pickup according to claim 4, wherein the cutaway section includes an opening section provided between the arc-like section and the edge section of the suspension-wire support base so that the arc-like section is connected to the edge section through the opening section, the opening section becoming wider from the arc-like section towards the edge section.

6. The optical pickup according to claim 4, wherein the land has a maximum width on a straight line that passes a center of the arc-like section with respect to the internal diameter and that divides the arc-like section into two equal parts.

* * * * *